United States Patent
Poor et al.

(10) Patent No.: US 11,544,325 B2
(45) Date of Patent: Jan. 3, 2023

(54) SYSTEM AND METHOD FOR QUERYING A DATA REPOSITORY

(71) Applicant: Palantir Technologies Inc., Palo Alto, CA (US)

(72) Inventors: Tony Poor, San Mateo, CA (US); Alessandro Mingione, Mountain View, CA (US); Roger Chen, Menlo Park, CA (US); Richard Wu, San Mateo, CA (US); Sebastian Brueckner, Redwood City, CA (US)

(73) Assignee: Palantir Technologies Inc., Denver, CO (US)

( * ) Notice: Subject to any disclaimer, the term of this patent is extended or adjusted under 35 U.S.C. 154(b) by 317 days.

(21) Appl. No.: 16/152,005

(22) Filed: Oct. 4, 2018

(65) Prior Publication Data

US 2019/0108258 A1 Apr. 11, 2019

(30) Foreign Application Priority Data

Oct. 5, 2017 (GB) .................... 1716303
Dec. 15, 2017 (GB) .................... 1720957

(51) Int. Cl.
*G06F 16/00* (2019.01)
*G06F 16/903* (2019.01)
(Continued)

(52) U.S. Cl.
CPC ...... *G06F 16/90335* (2019.01); *G06F 16/248* (2019.01); *G06F 16/2456* (2019.01);
(Continued)

(58) Field of Classification Search
CPC ............ G06F 16/248; G06F 16/335; G06F 16/90335; G06F 16/9038; G06F 16/904; G06F 16/958; G06Q 10/06316
(Continued)

(56) References Cited

U.S. PATENT DOCUMENTS

| | | | | |
|---|---|---|---|---|
| 9,424,333 | B1* | 8/2016 | Bisignani | G06F 16/248 |
| 9,576,032 | B2* | 2/2017 | Wolf | G06F 16/248 |
| 9,779,172 | B2* | 10/2017 | Chang | G06F 16/9535 |
| 2004/0143477 | A1* | 7/2004 | Wolff | G06Q 10/10 |
| | | | | 705/7.26 |

(Continued)

FOREIGN PATENT DOCUMENTS

EP 3467684 4/2019

OTHER PUBLICATIONS

Official Communication for European Patent Application No. 18198591.2 dated Nov. 7, 2018.
Official Communication for European Patent Application No. 18198591.2 dated Mar. 30, 2020, 6 pages.

*Primary Examiner* — Vincent F Boccio
(74) *Attorney, Agent, or Firm* — Knobbe, Martens, Olson & Bear, LLP (57) ABSTRACT

A method is disclosed, as well as systems, performed by one or more processors, for interacting with data in a data repository. The method comprises receiving, in a data catalogue environment, a search request relating to one or more items in the data repository and determining an object type associated with the one or more items. Other operations comprise loading an object template in dependence on the determined object type, populating the template with data from the data repository in dependence on the search request to create an object view, and displaying the object view within the data catalogue environment. The data repository comprises a plurality of joined datasets, and wherein the object view comprises one or more links to items in a joined dataset.

12 Claims, 6 Drawing Sheets

(51) Int. Cl.
  *G06F 16/904*   (2019.01)
  *G06F 16/2455*  (2019.01)
  *G06F 16/958*   (2019.01)
  *G06F 16/9038*  (2019.01)
  *G06F 16/335*   (2019.01)
  *G06F 16/901*   (2019.01)
  *G06F 16/2453*  (2019.01)
  *G06F 16/248*   (2019.01)

(52) U.S. Cl.
  CPC ...... *G06F 16/24544* (2019.01); *G06F 16/335* (2019.01); *G06F 16/904* (2019.01); *G06F 16/9024* (2019.01); *G06F 16/9038* (2019.01); *G06F 16/958* (2019.01)

(58) Field of Classification Search
  USPC .......................................................... 707/714
  See application file for complete search history.

(56) References Cited

U.S. PATENT DOCUMENTS

| | | | |
|---|---|---|---|
| 2007/0288248 A1 | 12/2007 | Rauch | |
| 2008/0162498 A1 | 7/2008 | Omoigui | |
| 2013/0226907 A1* | 8/2013 | Wolf | G06F 16/248 |
| | | | 707/722 |
| 2015/0135043 A1* | 5/2015 | Apps | G06Q 10/10 |
| | | | 715/202 |
| 2016/0246820 A1 | 8/2016 | Depaoli et al. | |

\* cited by examiner

SYSTEM AND METHOD FOR QUERYING A DATA REPOSITORY

INCORPORATION BY REFERENCE TO ANY PRIORITY APPLICATIONS

Any and all applications for which a foreign or domestic priority claim is identified in the Application Data Sheet as filed with the present application are hereby incorporated by reference herein in their entireties under 37 CFR 1.57 for all purposes and for all that they contain.

TECHNICAL FIELD

Embodiments relate to a system and method for querying a data repository. More particularly, this relates to a system and method of querying a data repository using a data catalogue.

BACKGROUND

Data is often modelled as tables, and data relating to specific objects/items can be spread across multiple tables, which can then be joined. This type of structured data is difficult for a user to search and interact with. For example, a user often has to learn database querying semantics.

Data catalogues can be used to facilitate a user searching for data. The data must usually be exported to a further program for the user to interact with and explore. This makes joined datasets difficult to handle within a data catalogue, and the user often has to manually determine data joins before exporting the required data.

SUMMARY

A first aspect comprises a method, performed by one or more processors, of interacting with data in a data repository comprising:

receiving, in a data catalogue environment, a search request relating to one or more items in the data repository;
determining an object type associated with the one or more items;
loading an object template in dependence on the determined object type;
populating the template with data from the data repository in dependence on the search request to create an object view; and
displaying the object view within the data catalogue environment,
wherein the data repository comprises a plurality of joined datasets, and wherein the object view comprises one or more links to items in a joined dataset.

The method may further comprise: determining if the loaded object template can be populated with additional items; retrieving the additional items from the data repository in dependence on the search request; and populating the object template with the additional items.

The method may further comprise: receiving a user input selecting a link from the one or more links; determining an object type of the linked item data; determining if linked items associated with the selected link are a compatible object type with the current object view; and in the event of a positive determination, repopulating the object template with data in dependence on the linked item.

The method may further comprise, in the event of a negative determination: retrieving a further object template in dependence on the object type of the linked item; populating the further object template in dependence on the linked item to generate a linked object view; and displaying the linked object view within the data catalogue environment.

Determining the object type may comprise: determining one or more properties of the one or more items; and determining the object type in dependence on the one or more properties.

The one or more properties of the one or more items may comprise: a data format; a data use history; a column and/or row title; and/or metadata associated with the one or more items.

Loading an object template in dependence on the determined object type may comprise: determining if an object template for the determined object type is stored in the system; and in the event of a negative determination, loading a default object template.

The object template may comprise indications of one or more joins between datasets in the data repository.

The one or more joins between datasets in the data repository may be inferred from properties of the datasets.

The data repository may comprise a plurality of tables.

The method may further comprise constructing a virtual table from the plurality of tables in dependence on the search request and the determined object type.

The search request may comprise one or more filters.

A second aspect provides a system comprising: a data repository comprising one or more datasets, and a data catalogue, wherein the system is configured to perform the method of any preceding method definition.

A third aspect provides a system comprising:
a data repository comprising one or more datasets;
a data catalogue,
wherein the system is configured to:
receive, in a data catalogue environment, a search request relating to one or more items in the data repository;
determine an object type associated with the one or more items;
load an object template based on the determined object type;
populate the template with data from the data repository in dependence on the search request to create an object view; and
display the object view within the data catalogue environment,
wherein the data repository comprises a plurality of joined tables, and wherein the object view comprises one or more links to items in a joined table.

A fourth aspect provides a computer program comprising computer readable instructions that, when executed by a computing apparatus, cause the computing apparatus to perform the method of any of preceding method definition.

A fifth aspect provides a non-transitory computer readable medium having computer readable code stored thereon, the computer readable code, when executed by at least one processor, causing performance of the steps of:

receiving, in a data catalogue environment, a search request relating to one or more items in the data repository;
determining an object type associated with the one or more items;
loading an object template based on the determined object type;
populating the template with data from the data repository in dependence on the search request to create an object view; and
displaying the object view within the data catalogue environment, wherein the data repository comprises a plurality of joined tables, and wherein the object view comprises one or more links to items in a joined table.

A sixth aspect provides an apparatus comprising one or more processors or special-purpose computing hardware configured to perform the method of any preceding method definition.

A seventh aspect provides an apparatus comprising:
one or more processors; and
a memory,
the memory comprising instructions that, when executed by one or more processors, cause the apparatus to perform the steps of:
receiving, in a data catalogue environment, a search request relating to one or more items in the data repository;
determining an object type associated with the one or more items;
loading an object template based on the determined object type;
populating the object template with data from the data repository in dependence on the search request to create an object view; and
displaying the object view within the data catalogue environment,
wherein the data repository comprises a plurality of joined tables, and wherein the object view comprises one or more links to items in a joined table.

BRIEF DESCRIPTION OF THE DRAWINGS

Example embodiments will now be described by way of non-limiting example with reference to the accompanying drawings, in which.

DETAILED DESCRIPTION

Figure 1:
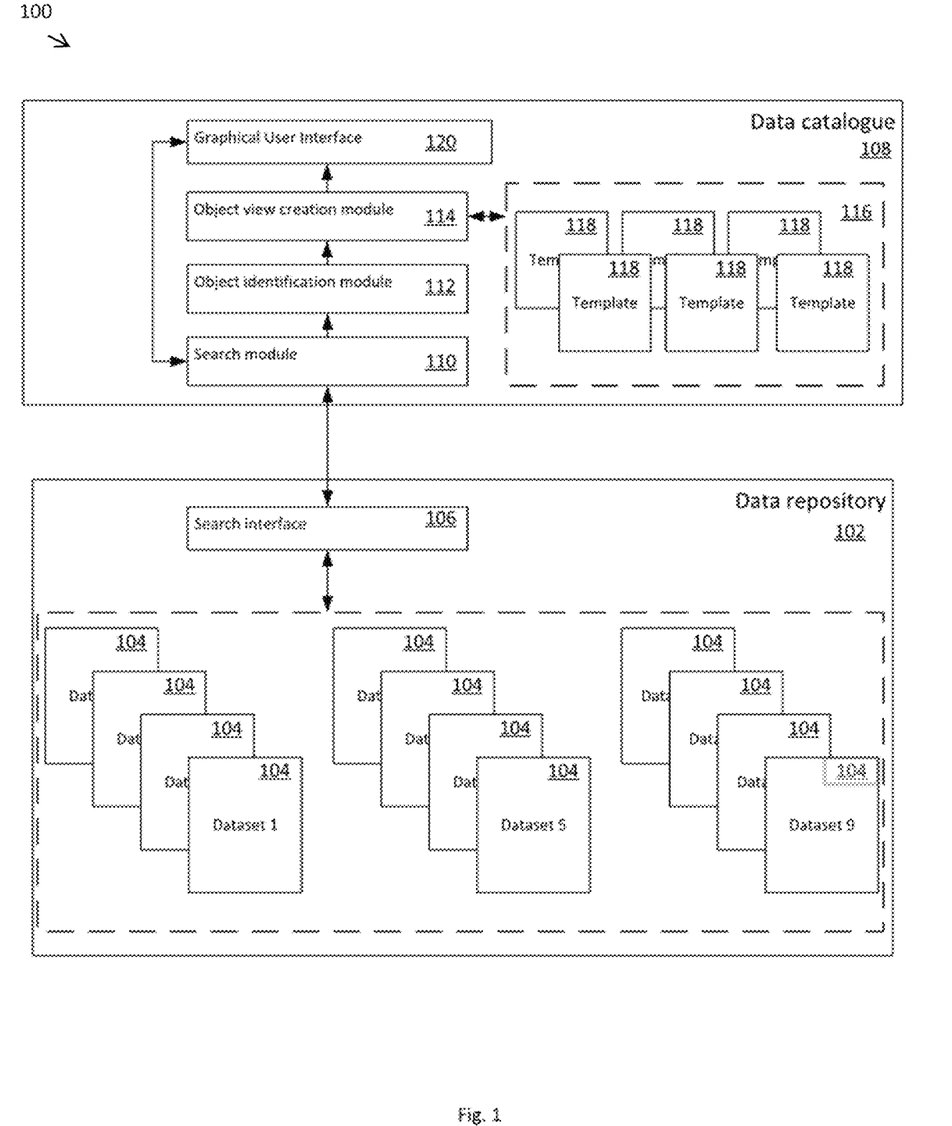
FIG. 1 shows a schematic example of a data processing system.

FIG. 1 shows a schematic example of a data processing system 100, which comprises a data repository 102 comprising one or more datasets 104. The data processing system 100 effectively takes modelled data from the data repository 102 and into a data catalogue environment 108, where it is curated to create an interactive version of the underlying data. This allows the data catalogue 108 to act as a browser for exploring data in the data repository without having to export the data to an external application for processing and viewing.

Each of the one or more datasets 104 may comprise data representing objects. Objects in the datasets 104 may also be referred to herein as items of data. The data repository 102 may contain a plurality of datasets 104. The datasets 104 may be in a table format, the tables comprising one or more rows and one or more columns of objects. The datasets 104 may comprise relational databases. The datasets 104 may comprise a plurality of linked tables.

The data repository 102 may be a distributed data repository, with the datasets 104 comprising the data repository being stored at a plurality of locations. One or more of the datasets 104 may be under control of one or more different entities. The datasets 104 may be edited by the entities that control them, for example to update the data in the dataset in light of new measurements and/or surveys.

An object (or item) may refer to a thing or a grouping of things with a given set of properties. An object may reference tangible or intangible things and/or animate or inanimate things. As non-limiting examples, an object may refer to one or more of persons, vehicles, portions of a vehicle, buildings, portions of buildings, investigations, portions of an investigation, schedules, rights or demands for rights, and one or more other things. Other types of objects are contemplated.

A definition of an object may describe the object by specifying or identifying one or more properties (e.g. characteristics) of the object. For example, an object may include a person and a definition of the object may describe the person by specifying or identifying particular properties (e.g. one or more of gender, height, weight, education, occupation, address, phone number) of the person. The values of the properties may be stored in one or more columns and/or rows of a database as one or more of strings, numbers and/or other forms of expression. The definition of the object may identify the particular columns and/or rows of the database storing the relevant values of the properties of the object. In some embodiments, a given property of an object may be derived from one or more values of datasets 104. For example, a given property of an object may be determined based on multiple values within one or more tables.

An object may be related to one or more other objects. Relationships among objects may be between objects of the same type (e.g. relationships between people objects, such as between family members, co-workers, persons who have interacted with each other) and/or between objects of different types (e.g. relationships between a person object and a non-person object, such as between a person and a schedule, a person and an investigation and so on.) For example, objects representing individual investigations (e.g. of accidents, of claims, of a demand for rights) may be related to an object representing a group of investigations (e.g. based on commonalities, based on a user input etc.) Such relationships may effectuate grouping individual investigations into groups of investigations. As another example, objects representing individual investigations may be related to an object representing persons (e.g. persons associated with investigations). Relationships between objects may include one-to-one relationships, one-to-many relationships, many-to-one relationships, many-to-many relationships, and/or other relationships.

The data repository 102 may further comprise a search interface 106, via which one or more external applications can search and access the datasets 104 in the data repository 102. In some embodiments, the search interface 106 may be configured to allow multiple external applications to access the data repository 102 simultaneously or in sequence.

The system 100 may further comprise a data catalogue 108 (herein also referred to as a data catalogue environment). The data catalogue 108 is configured to act as a front-end for accessing, searching and/or retrieving data in the data repository 102. The data catalogue 108 may also be referred to as a database catalogue. It may comprise a directory of information about datasets 104 in the data repository 102. The data catalogue 108 can allow the datasets 104 in the data repository 102 to be searched, filtered and/or sorted.

The data catalogue 108 may comprise a graphical user interface 120 (GUI) through which a user can input commands and/or search requests. The GUI 120 can receive inputs in the form of alphanumeric text and/or user selected filters and/or options, for example. Objects returned by a search request may be viewed through the GUI 120. A list of objects meeting search criteria of the search request can be displayed on the GUI 120. The user may select one or more the objects to view and/or interact with. Selection may be by means of any known method, such as by using a mouse or other pointer controller or by means of a touch-screen interface.

The data catalogue 108 may comprise one or more search modules 110. A search module 110 can interface with the search interface 106 of the data repository 102 in order to access, search and/or retrieve data in datasets 104 in the data repository. The search module 110 may interface with the search interface 106 using an application programming interface (API). The search module 110 can receive search requests and/or commands from one or more users via the GUI 120.

The search module 110 of the data catalogue 108 may be configured to send a request to the search interface 106 for data associated with the search request. In some embodiments, the search module 110 may convert the search request into a database query for searching the data repository 102, prior to sending the search request to the search interface 106. In some embodiments, the search module 110 transmits a request to the data repository 102 for data from a specific location in the data repository.

The search module 110 of the data catalogue 108 may also be configured to receive the results of the search request from the search interface 106. The results of the search, command and/or request can be displayed to the user via the GUI 120. For example, the search results can be displayed in the GUI 120 in the form of a selectable list or other suitable format. One or more filters and/or orderings can be applied to the results. For example, the results can be ordered by one or more of relevance; chronologically; by size; and by location.

A user can select one or more of the search results to explore the data in further detail. Items of data received in response to the search request that relate to the selected search results are passed to an object identification module 112 for identification of their object type.

The data catalogue 108 may further comprise an object identification module 112. The object identification module 112 may determine the object type of items of data received from the data repository 102 in response to a search request. In some embodiments, the object identification module 112 may determine the object type from metadata associated with the received items of data. This metadata may be stored in an ontology (not shown) that can be accessed by the object identification module 112.

Alternative or additionally, the object identification module 112 can determine the object type from properties of the received items of data. For example, the format of the items of data may provide an indication of the object type. For example, if the items of data comprise data in the form of geolocation coordinates, these may have a common format that is recognisable by the object identification module 112, which can then associate the items of data with a "location" object type. Another example is the usage history of the items of data. The identity of programs and/or other search requests that have viewed the items of data can be used to identify the object type. For example, an item viewed through an imaging program may be associated with the "image" object type. The one or more properties of the one or more items may comprise: a data format; a data use history; a column and/or row title; and/or metadata associated with the one or more items.

The data catalogue 108 may further comprise an object view creation module 114. The object view creation module 114 receives the retrieved items of data and their associated object types from the object identification module 112. The object view creation module 114 accesses a template library 116 comprising one or more object templates 118 and retrieves a template 118 associated with the determined object type.

Templates 118 serve as a guide for displaying the retrieved data to the user in an interactive way within the data catalogue environment 102. Templates may comprise one or more sub-elements for displaying items of data from the data repository 102. The sub elements may, for example, comprise one or more of the following elements, in combination or alone: a text box; a graph; an image; a list; a link; and/or a filter.

Templates 118 can, in some embodiments, be customisable from within the data catalogue environment. The user can define, for example: the layout of the template; the sub-elements present in the template; identities of joins between datasets associated with the template; the object types associated with the template; the filters present on the template; visual properties/styles of the template; and/or object types associated with the template. Joins between datasets can, in some embodiments, be inferred during customisation of the template.

In those embodiments where joins are inferred during customisation of the template, the joins may be inferred based on the template. The sub-elements of the template may each reference one or more properties of various objects. By determining the object types referenced in the template, the datasets upon which the template depends may be determined. Where there is a link between two or more of these datasets, e.g. a foreign key or other identifier in one of the datasets referencing an element in another, this link is inferred to be usable to perform a join enabling corresponding data of the two underlying objects to be retrieved and displayed.

The object view creation module 114 then populates the retrieved template 118 with the item data received from the data repository 102 in dependence on the search request. If the search request specified, for example, some display options or filters, these can be applied by the object view creation module 114. The template 118 may require additional items of data in addition to the retrieved data to be fully populated. If so, these are retrieved from the data repository 102 as well.

The resulting object view is then displayed to the user via the GUI 120. The object view comprises one or more links to items in a table linked to the item data displayed in the object view. The object view may comprise links to other objects, as defined in the template. The links may be one-to-one, one-to-many or many-to-one. Where one-to-many links are indicated by the template, the object view may include one or more tabs allowing the user to select which of the links to navigate to view a linked object.

In some embodiments, the items of data used to populate the template 118 to create the object view are used to generate a virtual table associated with the object view. The virtual table can abstract away joins between the datasets.

The user can interact with the object view to view the virtual table, for example to customise or edit the data. Edits to the data in the virtual table may be propagated back to the source of the relevant data item, i.e. the underlying dataset from which the edited portions, e.g. the edited columns, of the data were retrieved. The object view created from the template may comprise a link to the virtual table. The virtual table may be exportable from the data catalogue environment.

The virtual table associated with the object view has a range of possible uses. The virtual table may underlie the object view by presenting the data referenced by the various elements of the template which may be received from a range of objects and datasets. Generating the virtual table may involve retrieving data and performing joins. An advantage of using such a virtual table is that it may enable the data underlying the object view to be cached meaning that joins do not need to be performed again every time that the object view is reloaded. In some embodiments, the virtual table may be generated by performing joins that have been inferred from a template and filtering the joined data according to the properties referenced in this template.

It will be appreciated that the system described with reference to FIG. 1 is exemplary, and many other implementations are possible. For example, in some embodiments the object identification module 112 and/or object view creation module 114 may be located in the data repository 102. The template library 116 can be located in the data repository 102, from which the templates can be retrieved by the data catalogue 108.

Figure 2:
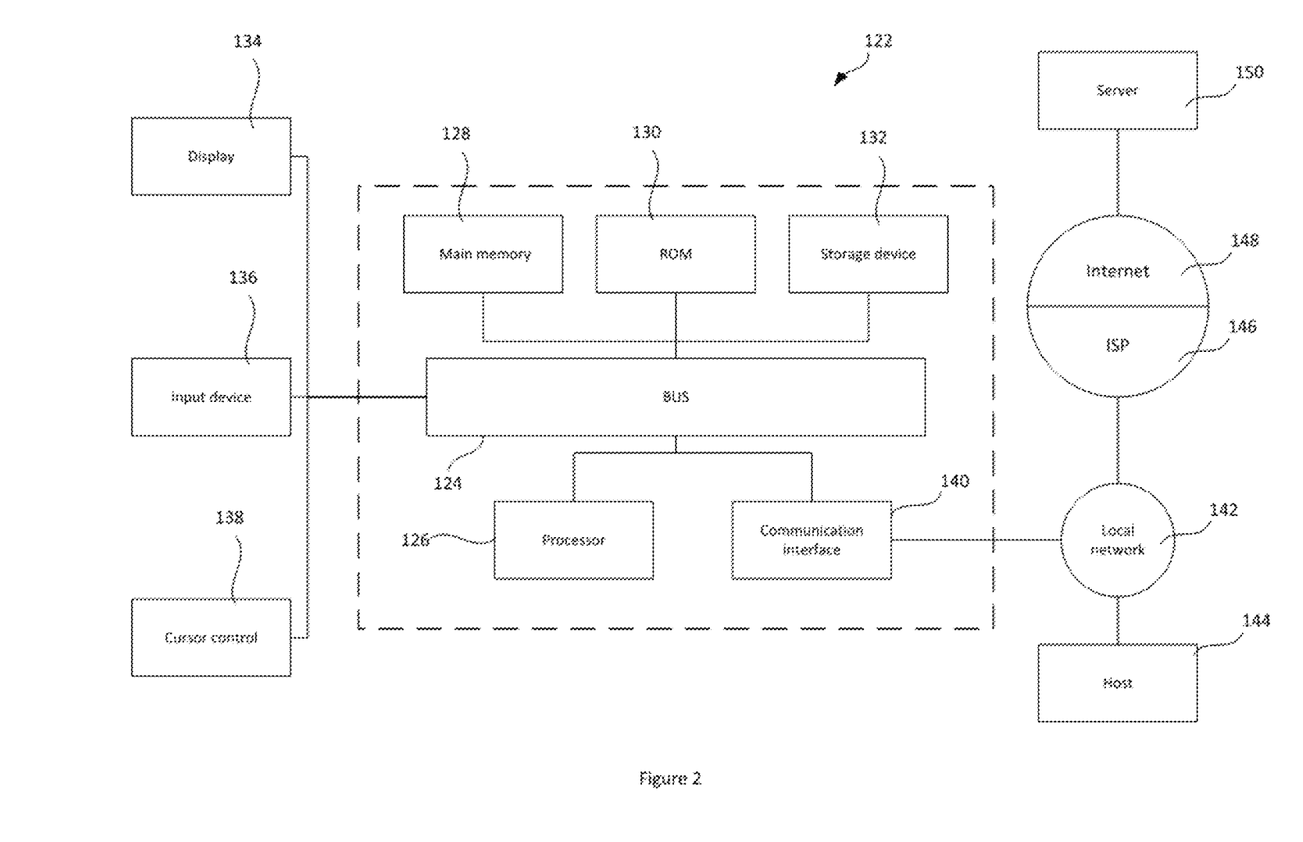
FIG. 2 shows a block diagram of an exemplary computer system.

Referring to FIG. 2, a block diagram of an exemplary computer system, which may comprise the data repository 102, the client device, the data aggregation module and/or the ontology layer, consistent with examples of the present specification is shown.

Computer system 122 includes a bus 124 or other communication mechanism for communicating information, and a hardware processor 126 coupled with bus for processing information. Hardware processor 126 can be, for example, a general purpose microprocessor. Hardware processor 126 comprises electrical circuitry.

Computer system 122 includes a main memory 128, such as a random access memory (RAM) or other dynamic storage device, which is coupled to the bus for storing information and instructions to be executed by processor. The main memory 128 can also be used for storing temporary variables or other intermediate information during execution of instructions by the processor 126. Such instructions, when stored in non-transitory storage media accessible to the processor, render the computer system 122 into a special-purpose machine that is customized to perform the operations specified in the instructions. The main memory 128 may be referred to as volatile memory.

Computer system 122 further includes a read only memory (ROM) 130 or other static storage device 132 coupled to the bus for storing static information and instructions for the processor 1. A storage device 132, such as a magnetic disk or optical disk, is provided and coupled to the bus for storing information and instructions.

Computer system 122 can be coupled via the bus to a display 134, such as a cathode ray tube (CRT), liquid crystal display, or touch screen, for displaying information to a user. An input device 136, including alphanumeric and other keys, is coupled to the bus 124 for communicating information and command selections to the processor 126. Another type of user input device 136 is cursor control 138, for example using a mouse, a trackball, or cursor direction keys for communicating direction information and command selections to the processor and for controlling cursor movement on the display. The input device 136 typically has two degrees of freedom in two axes, a first axis (for example, x) and a second axis (for example, y), that allows the device to specify positions in a plane.

Computer system 122 can implement the techniques described herein using customized hard-wired logic, one or more ASICs or FPGAs, firmware and/or program logic which in combination with the computer system causes or programs computer system to be a special-purpose machine. According to some embodiments, the operations, functionalities, and techniques disclosed herein are performed by computer system in response to the processor executing one or more sequences of one or more instructions contained in the main memory. Such instructions can be read into the main memory from another storage medium, such as storage device. Execution of the sequences of instructions contained in main memory causes the processor to perform the process steps described herein. In alternative embodiments, hard-wired circuitry can be used in place of or in combination with software instructions.

The term "storage media" as used herein refers to any non-transitory media that stores data and/or instructions that cause a machine to operate in a specific fashion. Such storage media can comprise non-volatile media and/or volatile media. Non-volatile media includes, for example, optical or magnetic disks, such as storage device. Volatile media includes dynamic memory, such as main memory 128. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from, but can be used in conjunction with, transmission media. Transmission media participates in transferring information between storage media. For example, transmission media includes coaxial cables, copper wire and fibre optics, including the wires that comprise bus. Transmission media can also take the form of acoustic or light waves, such as those generated during radio-wave and infra-red data communications.

Various forms of media can be involved in carrying one or more sequences of one or more instructions to processor for execution. For example, the instructions can initially be carried on a magnetic disk or solid state drive of a remote computer. The remote computer can load the instructions into its dynamic memory and send the instructions over a telephone line or other transmission medium using a modem. A modem local to computer system can receive the data on the telephone line or other transmission medium and use an infra-red transmitter to convert the data to an infra-red signal. An infra-red detector can receive the data carried in the infra-red signal and appropriate circuitry can place the data on bus. Bus carries the data to the main memory, from which the processor retrieves and executes the instructions. The instructions received by the main memory can optionally be stored on the storage device either before or after execution by the processor.

Computer system also includes a communication interface 140 coupled to the bus 124. The communication interface provides a two-way data communication coupling to a network link that is connected to a local network 142. For example, the communication interface can be an integrated services digital network (ISDN) card, cable modem, satellite modem, or a modem to provide a data communication connection to a corresponding type of telephone line. As another example, the communication interface 140 can be a local area network (LAN) card to provide a data communication connection to a compatible LAN. Wireless links can also be implemented. In any such implementation, the communication interface 140 sends and receives electrical, electromagnetic or optical signals that carry digital data streams representing various types of information.

The network link typically provides data communication through one or more networks to other data devices. For example, the network link can provide a connection through the local network 142 to a host computer 144 or to data equipment operated by an Internet Service Provider (ISP) 146. The ISP 146 in turn provides data communication services through the world wide packet data communication network now commonly referred to as the "Internet" 148. The local network 142 and internet 148 both use electrical, electromagnetic or optical signals that carry digital data streams. The signals through the various networks and the signals on the network link and through the communication interface, which carry the digital data to and from the computer system, are example forms of transmission media.

The computer system can send messages and receive data, including program code, through the network(s), network link and communication interface. For example, a first application server may transmit data through the local network to a different application server 150.

Figure 3:
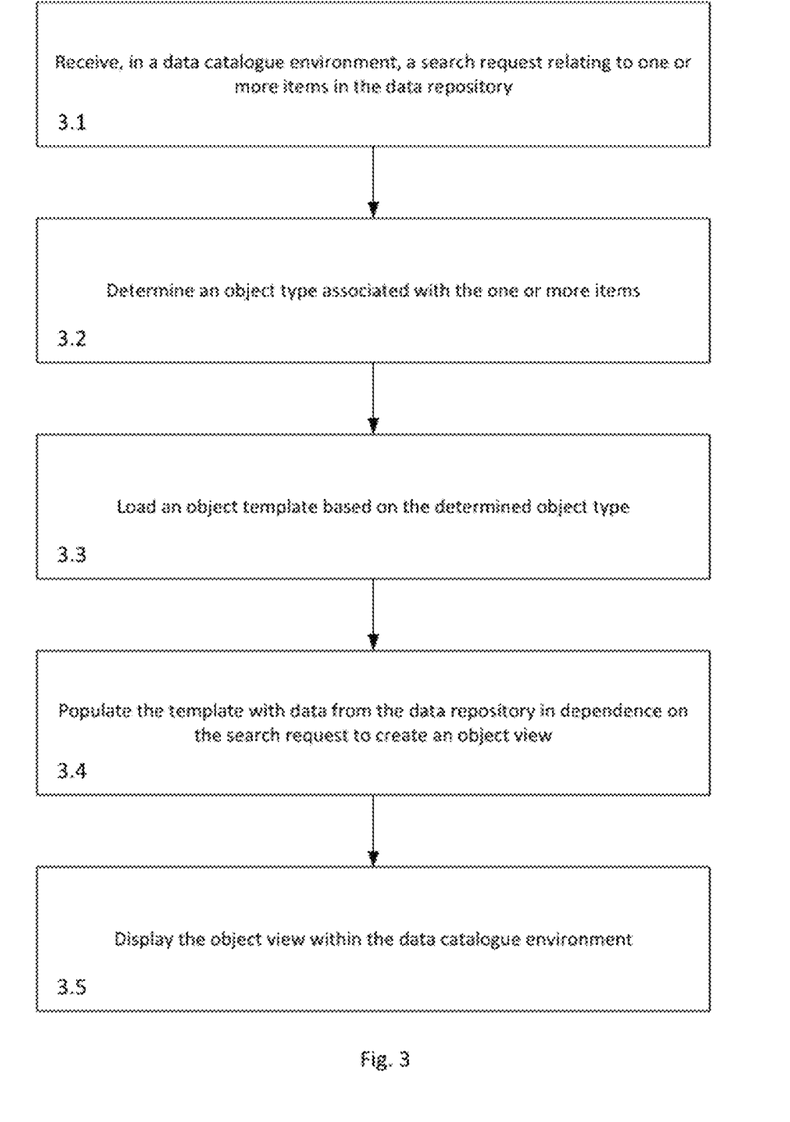
FIG. 3 shows a flow chart of an example of a method for querying a data repository.

FIG. 3 shows a flow chart of an example of a method for querying a data repository.

A search request, request for data, and/or command (collectively referred to in the following as a search request) is input into a graphical user interface 120 of a data catalogue 108 by a user via a user device (operation 3.1). The search request relates to one or more datasets 104 in the data repository 102. The search request can comprise a request to display one or more objects in the datasets 104. The user device comprises a display for display of results of the user search request, and is herein also referred to as a display device.

The search request can be input through a graphical user interface 120 using high-level commands. The high level commands are converted by the system into database queries for querying the one or more datasets 104 in the data repository 102, for example by the search module 110. In some examples, the high level commands can be input using a functional language. In some embodiments, the high level commands are input through selecting options in a graphical user interface.

The search request is passed to the data repository 102, where it is used to retrieve one or more items of data relating to the search request. A search request may return one or more objects/items of data that match one or more searching criteria. Criteria for a search request may include one or more parameters relating to properties of objects, reference identifiers of objects, and/or other criteria. In some embodiments, a reference identifier for an object may include one or more of a service, instance, type and/or locator. One or more filters may be supplied with the search request. In some embodiments, a search request may support a keyword filter (e.g., searching one or more fields of objects for a specified query string/value), an object type filter (e.g. limiting the search results to a specific set of object types or linked object types), a property filter (e.g. specifying a query string/value to match on to one or more specific properties for a specific object/object type/linked object and/or one or more global properties that multiple objects/object types may share). A search result may require matching on some or all of the specified criteria.

The object representation allows filters to be used and analysis to be performed on objects without knowledge of database joins and/or database semantics. When working in the object representation, a user can filter results by properties of linked objects. For example, a filter may comprise "all [initial object's] with a [linked object's] having [linked object property/properties]".

The retrieved objects/items of data are passed back to the data catalogue environment 108. The data catalogue environment 108 then determines the object type associated with the one or more items of data at operation 3.2.

Determination the object type, in some embodiments, comprises determining one or more properties of the retrieved items of data. The search request can also be used to determine the object type. This is particularly useful when retrieved data is associated with more than one object type.

Based on the determined object type, at operation 3.3 the data catalogue 108 loads an object template 118 associated with the determined object type. The object template 118 may be stored in an object template library 116 in the data catalogue 108, as shown in FIG. 1.

In some embodiments, the system checks whether the determined object type has an associated template in the template library 116. If a template for the determined object type is available, that object template 118 is loaded by the system. If the determined object type has no associated object template in the template library 116, the system instead loads a default template.

The loaded object template is populated with the retrieved item data at operation 3.4 to create an object view.

At operation 3.5, the object view is displayed with the data catalogue environment 108. Displaying the object view within the data catalogue environment 120 can result in a more efficient use of computing resources, as the user does not have to manually export data to a further application.

Figure 4:
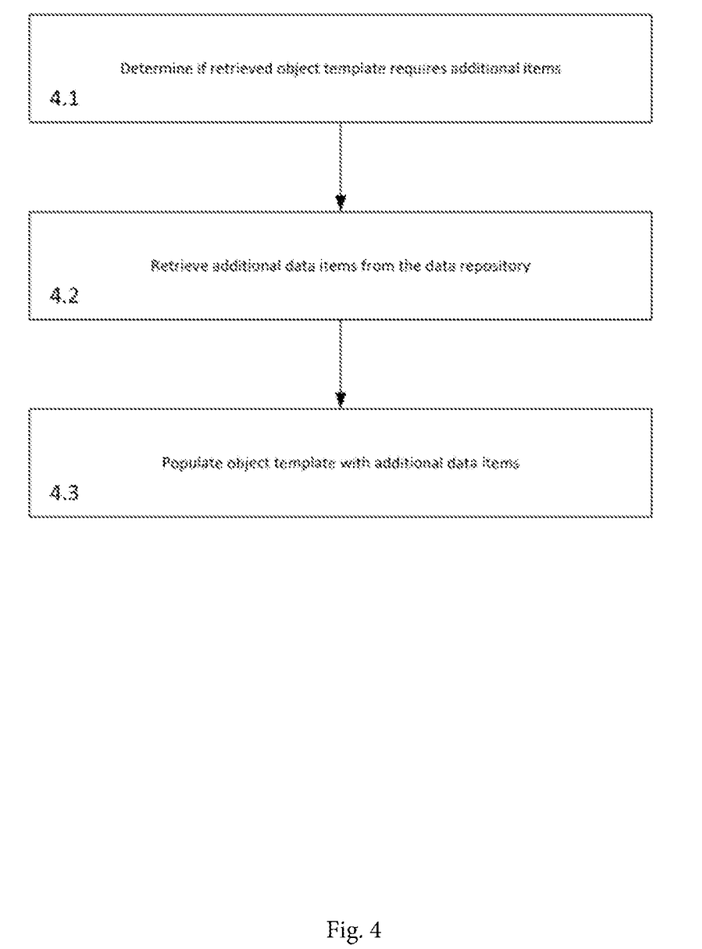
FIG. 4 shows a flowchart of an example of a method for populating an object template.

FIG. 4 shows a flowchart of an example of a method for populating an object template.

The loaded object template may, in some embodiments, require additional item data from the data repository in order to create the object view. This item data may be found in dataset 104 linked to the retrieved item data received in response to the search request.

At operation 4.1, the system determines if the retrieved object template requires additional items of data from the data repository. The template may comprise one or more elements in addition to the elements associated to the retrieved data. The additional items of data can be from a linked dataset. For example, as search request may relate to a person, and the retrieved data comprise the person's name and description. The "person" object template is therefore loaded. The template may comprise a picture element that displays a profile picture of the person, in addition to the elements for displaying the person's name and description.

At operation 4.2, the additional items of data are retrieved from the data repository. The template may comprise definitions of joins between datasets. These definitions facilitate identification of the required additional items of data. Continuing with the example of a person from above, the template may define that image data relating to retrieved person data can be found in one or more joined datasets.

By retrieving the additional items of data from joined datasets, data redundancy may be minimised. For example, if the person data did not join to a separate dataset containing the image data, the image data would need to be stored in the same dataset as the person data. However, if this image data needed to be used in another context, e.g. indexed by date in a photo library display, it would either require the image data to be stored again in the photo library display dataset or require the person data to be accessed by the photo library display. By retrieving the additional items of data using joins, the image data may be stored in its own dataset but be usable by both the photo library display template and the person template. Furthermore, updates performed to the image data in one location would become usable in the other.

Retrieving the additional items of data from the data repository can be based on the search request. For example, the search request may provide an identity of an object to which it relates. The search request may further provide one or more filters that can be applied to the retrieved data. For example, a user can filter by properties of linked objects. An example of a filter that can be applied in this way is "all [initial object's] with a [linked object's] having [linked object property/properties]". Many other filters can built up in this way, and may include, for example, multiple linked objects, and multiple linked object properties. The object representation allows analysis of this type to be performed without requiring knowledge of joins in the datasets and/or any knowledge of database semantics.

At operation 4.3, the template is populated with the additional items of data. The operations 4.1-4.3 can be iterated until the template is fully populated.

Figure 5:
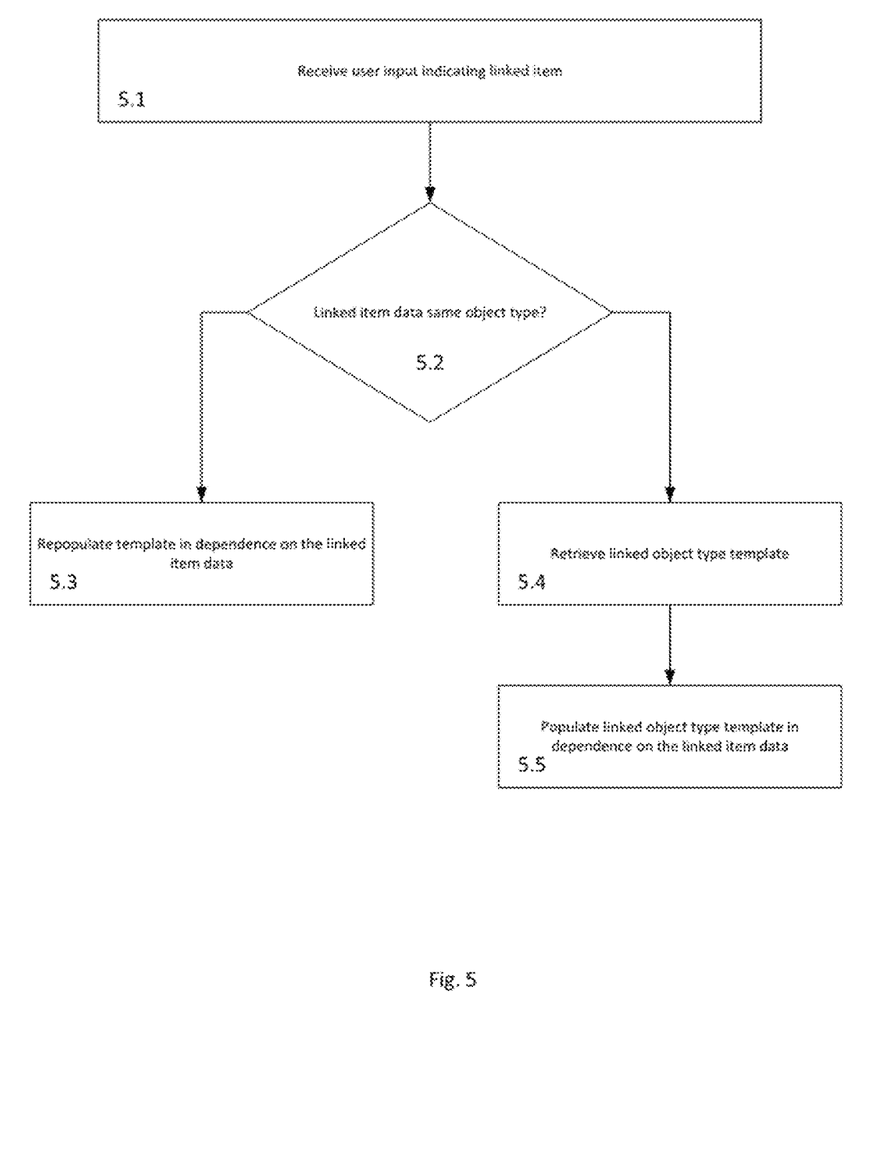
FIG. 5 shows a flowchart of an example method for interacting with an object view.

FIG. 5 shows a flowchart of an example method for interacting with an object view.

The object view comprises one or more links to linked items of data. The links can be presented to the user through the graphical interface in the form of, for example, clickable icons and/or clickable text.

At operation 5.1, system receives a user input indicating that the user has selected the linked item. For example, the user may select a link within an object view they are browsing using a mouse input. Data relating to the linked item can then be retrieved from the data repository 102 in a similar way to if the user had submitted a search request relating to that data.

At operation 5.2, it is determined if the linked item is the same (or a compatible) object type as the current object view. Determining if the linked item is of the same object type can, in some embodiments, involve determining the object type of the linked data in the same or a similar way as described in relation to FIGS. 1 and 3. Alternatively or additionally, the template used to create the object view may contain metadata identifying the object types of the linked data displayed in the object view.

If the determination is positive, at operation 5.3 the object template is repopulated with the linked item data to generate an object view for the linked object.

If the determination is negative, at operation 5.4 the system retrieves the object template that matches the object type of the linked data. The retrieved object template is then populated with the linked item data at operation 5.5.

Figure 6:
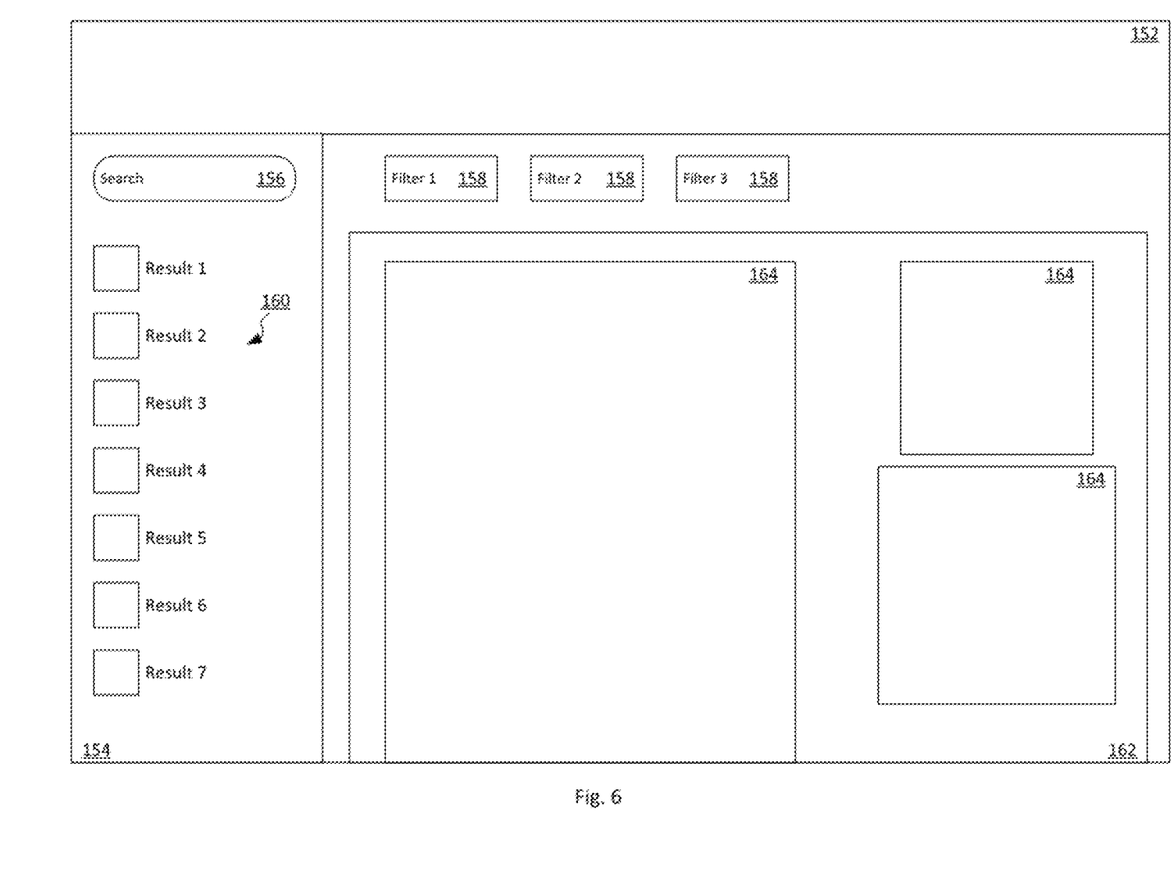
FIG. 6 illustrates an example graphical user interface for a data catalogue environment.

FIG. 6 illustrates an example graphical user interface for a data catalogue environment.

The interface comprises a toolbar 152. The toolbar 152 provides a control element displaying icons and/or menus relating to the user interface. For example, the toolbar 150 may provide file access features, save options and user settings.

The interface further comprises a search panel 154. The search panel 154 comprises a keyword search module 156 through which the user may input search requests. One or more filters 158 can be added to the search request, for example by selecting filters from a drop down menu. Multiple filters can be added to a search request. As the user is adding a filter, the user can also be provided with a distribution of the options they can chose from.

The search panel 154 displays search results 160 based on search requests input into the keyword search module 156. The search results 160 can be displayed in the form of a list. Each of the search results 160 can be presented in the form of a selectable icon. Selecting the icon associated with a result loads the items of data relating to that result, as described above in relation to FIGS. 1 to 5.

The object view associated with the selected search result is displayed in an object view panel 162. The object view panel 162 comprises the object view created from a template. The object view comprises one or more sub-panels 164, each of which comprises one or more items of data. For example, the sub panels may comprise: a graph, such as a bar chart, line graph, scatter graph and/or pie chart; text; numerical data; images; video; and/or links to other search results and/or related objects in the data repository 102.

By providing an input, e.g. a double click or tap, to the object view panel 162 or to one of the sub-panels 164, an interface displaying a virtual table associated with the object view may be displayed to the user. The virtual table may be rendered in the same graphical user interface as the object view or a new graphical user interface, e.g. a new window, may be opened to display the virtual table. The virtual table may be rendered using a data grid control, e.g. a HTML5/Javascript data grid. The data grid control may provide a spreadsheet style interface which enables the user to interact with and edit the displayed data. Subsequent to receiving an edit, the data grid control may propagate it back to the underlying virtual table which, in turn, may propagate it back to the one or more underlying datasets.

Methods described in the illustrative embodiments may be implemented as program modules or functional processes including routines, programs, objects, components, data structures, etc., that perform particular tasks or implement particular functionality, and may be implemented using existing hardware. Such existing hardware may include one or more processors (e.g. one or more central processing units), digital signal processors (DSPs), application-specific-integrated-circuits, field programmable gate arrays (FPGAs), computers, or the like.

Unless specifically stated otherwise, or as is apparent from the discussion, terms such as processing or computing or calculating or determining or the like, refer to the actions and processes of a computer system, or similar electronic computing device. Note also that software implemented aspects of the example embodiments may be encoded on some form of non-transitory program storage medium or implemented over some type of transmission medium. The program storage medium may be magnetic (e.g. a floppy disk or a hard drive) or optical (e.g. a compact disk read only memory, or CD ROM), and may be read only or random access. Similarly the transmission medium may be twisted wire pair, coaxial cable, optical fibre, or other suitable transmission medium known in the art. The example embodiments are not limited by these aspects in any given implementation.

It will be appreciated that many modifications may be made to the embodiments hereinbefore described. Such modifications may involve equivalent and other features which are already known in automated monitoring and control of machinery, and which may be used instead of or in addition to features already described herein. Features of one embodiment may be replaced or supplemented by features of another embodiment.

In the above detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first user interface could be termed a second user interface, and, similarly, a second user interface could be termed a first user interface, without departing from the scope of the various described implementations. The first user interface and the second user interface are both types of user interfaces, but they are not the same user interface.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

Although claims have been formulated in this application to particular combinations of features, it should be understood that the scope of the disclosure of the present disclosure also includes any novel features or any novel combination of features disclosed herein either explicitly or implicitly or any generalization thereof, whether or not it relates to the same disclosure as presently claimed in any claim and whether or not it mitigates any or all of the same technical problems as does the present disclosure.

What is claimed is:

1. A method, performed by one or more processors, of interacting with data in a data repository, the method comprising:
   receiving, in a data catalogue environment, a search request relating to a data object in a data repository storing a plurality of data objects, wherein the data objects in the data repository are associated with data object types;
   determining a data object type associated with the data object by reference to properties associated with the data object and a data ontology;
   determining a data object template in dependence on the determined data object type, wherein:
      the data object template comprises a plurality of display elements for a graphical user interface, and
      the data object template comprises definitions of one or more joins between datasets in the data repository to facilitate identification of additional data items for the data object;
   automatically populating one or more display elements of the data object template with data items associated with the data object from a first dataset in the data repository in dependence on the search request to create a data object view graphical user interface;
   determining whether the populated data object template includes one or more unpopulated display elements that can be populated with one or more additional data items;
   in response to determining that the one or more unpopulated display elements of the populated data object template can be populated with one or more additional data items:
      identifying, based on the definitions of the one or more joins between datasets, a second dataset in the data repository that is joined to the first dataset and that includes the one or more additional data items corresponding to the one or more unpopulated display elements;
      automatically retrieving the one or more additional data items from the second dataset in the data repository based on the definitions of the one or more joins in the populated data object template; and
      automatically populating the one or more unpopulated display elements of the populated data object template with the retrieved additional data items to update the data object view graphical user interface; and
   displaying the data object view graphical user interface of the data object,
   wherein the data object view graphical user interface comprises one or more selectable links to linked data objects as defined by the data object template.

2. The method of claim 1, further comprising:
   receiving a user input selecting a link from the one or more selectable links;
   determining a data object type of a linked data object associated with the selected link;
   determining if the data object type of the linked data object associated with the selected link is compatible with the current data object view graphical user interface; and
   in the event of a positive determination, repopulating the data object template with data in dependence on the linked data object.

3. The method of claim 2, further comprising:
   in the event of a negative determination:
      retrieving a further data object template in dependence on the object type of the linked data object, wherein the data object type of the linked data object is compatible with the further data object template;
      populating the further data object template in dependence on the linked data object to generate a linked data object view graphical user interface; and
      displaying the linked data object view graphical user interface.

4. The method of claim 3, wherein determining the object type comprises:
   determining one or more properties of the data object.

5. The method of claim 4, wherein the one or more properties of the data object comprises: a data format; a data use history; a column and/or row title; and/or metadata associated with the data object.

6. The method of claim 5, wherein determining a data object template in dependence on the determined data object type comprises:
   determining if a data object template for the determined data object type is stored in the system; and
   in the event of a negative determination, loading a default data object template.

7. The method of claim 6, wherein the one or more joins between datasets in the data repository are inferred from properties of the datasets.

8. The method of claim 7, wherein the data repository comprises a plurality of tables.

9. The method of claim 8, further comprising constructing a virtual table from the plurality of tables in dependence on the search request and the determined data object type.

10. The method of claim 9, wherein the search request comprises one or more filters.

11. A system comprising:
   a data repository comprising a plurality of data objects, wherein the data objects in the data repository are associated with data object types;
   wherein the system is configured to:
      receive, in a data catalogue environment, a search request relating to a data object in the data repository;
      determine a data object type associated with the data object by reference to properties associated with the data object and a data ontology;
      determine a data object template based on the determined data object type, wherein:
         the data object template comprises a plurality of display elements for a graphical user interface, and
         the data object template comprises definitions of one or more joins between datasets in the data repository to facilitate identification of additional data items for the data object;
      automatically populate one or more display elements of the data object template with data items associated with the data object from a first dataset in the data repository in dependence on the search request to create a data object view graphical user interface;
      determine whether the populated data object template includes one or more unpopulated display elements that can be populated with one or more additional data items;
      in response to determining that the one or more unpopulated display elements of the populated data object template can be populated with one or more additional data items:
         identify, based on the definitions of the one or more joins between datasets, a second dataset in the data repository that is joined to the first dataset and that includes the one or more additional data items corresponding to the one or more unpopulated display elements;
         automatically retrieve the one or more additional data items from the second dataset in the data repository based on the definitions of the one or more joins in the populated data object template; and
         automatically populate the one or more unpopulated display elements of the populated data object template with the retrieved additional data items to update the data object view graphical user interface; and
      display the data object view graphical user interface of the data object,
   wherein the data object view graphical user interface comprises one or more selectable links to linked data object as defined by the data object template.

12. A non-transitory computer readable medium having computer readable code stored thereon, the computer readable code, when executed by at least one processor, causing performance of operations comprising:
   receiving, in a data catalogue environment, a search request relating to a data object in a data repository storing a plurality of data objects, wherein the data objects in the data repository are associated with data object types;
   determining a data object type associated with the data object by reference to properties associated with the data object and a data ontology;
   determining a data object template based on the determined data object type, wherein:
      the data object template comprises a plurality of display elements for a graphical user interface, and
      the data object template comprises definitions of one or more joins between datasets in the data repository to facilitate identification of additional data items for the data object;
   automatically populating one or more display elements of the data object template with data items associated with the data object from a first dataset in the data repository in dependence on the search request to create a data object view graphical user interface;
   determining whether the populated data object template includes one or more unpopulated display elements that can be populated with one or more additional data items;
   in response to determining that the one or more unpopulated display elements of the populated data object template can be populated with one or more additional data items:
      identifying, based on the definitions of the one or more joins between datasets, a second dataset in the data repository that is joined to the first dataset and that includes the one or more additional data items corresponding to the one or more unpopulated display elements;
      automatically retrieving the one or more additional data items from the second dataset in the data repository based on the definitions of the one or more joins in the populated data object template; and
      automatically populating the one or more unpopulated display elements of the populated data object template with the retrieved additional data items to update the data object view graphical user interface; and
   displaying the data object view graphical user interface of the data object,
   wherein the data object view graphical user interface comprises one or more selectable links to linked data objects as defined by the data object template.

* * * * *